Figure 1:
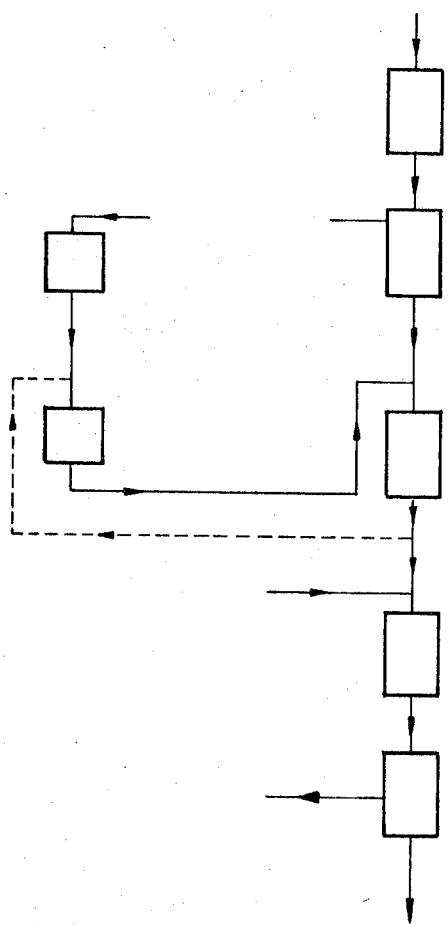

United States Patent
Westberg

[15] 3,652,406
[45] Mar. 28, 1972

[54] PROCESS FOR SEWAGE TREATMENT

[72] Inventor: Nils K. G. Westberg, Lidingo, Sweden

[73] Assignee: Aktiebolaget Vallenbyggnadsbyran, Stockholm, Sweden

[22] Filed: Apr. 20, 1970

[21] Appl. No.: 30,146

[30] Foreign Application Priority Data

Apr. 23, 1969 Sweden....................5781/69

[52] U.S. Cl..............................210/11, 210/15
[51] Int. Cl........................................C02c 1/02
[58] Field of Search ......................210/3–9, 11, 14, 210/15

[56] References Cited

UNITED STATES PATENTS

| | | | |
|---|---|---|---|
| 2,254,953 | 9/1941 | Thomas | 210/4 X |
| 2,562,510 | 7/1951 | Schlenz | 210/5 |
| 3,047,492 | 7/1962 | Gambrel | 210/7 |
| 3,220,706 | 11/1965 | Valdespino | 210/5 X |
| 3,356,609 | 12/1967 | Bruemmer | 210/7 |

*Primary Examiner*—Michael Rogers
*Attorney*—Albert M. Parker

[57] ABSTRACT

A process for biological treatment of sewage is disclosed, characterized by the addition of a high-activated sludge containing a culture of heterotrophical bacteria to the sewage as an inoculum, before or after the inlet of a biological oxidizing means. The high-activated sludge is produced of at least a portion of the separated primary sludge by aeration in a separate cultivating basin.

3 Claims, 4 Drawing Figures

PROCESS FOR SEWAGE TREATMENT

The present invention relates to improvements in processes and systems for biological treatment of sewage, including spent water from a community as well as wastes from domestic and trade premises and industrial waste water, wherein said sewage is aerated in a biological oxidizing means after a separation of easily settleable matters in a primary clarifier.

Sewage purification by primary treatment, i.e., mechanical purification by straining, sedimentation, etc., is not always quite sufficient and today many treatment plans have been completed by biological purifying methods. In principle the same process is used which in nature brings about biological purification of water. The biological purification involves an oxidation of organic substance while consuming oxygen and also the formation and coagulation of suspended matter to a great part consisting of cell substance, i.e., living and dead bacteria cells. One condition for the continuance of this process is that the oxygen dissolved in the water, which is consumed by the bacteria, be constantly resupplied. The supply of oxygen is effected either by air being blown in continuously or by passing the water in the form of a spray through air. In both cases, the desired rapid absorption of oxygen is obtained by enlargement of the contact surface between the water and the air.

It has been found that aeration of the sewage alone is not sufficient to achieve a rapid purifying process and therefore the sewage also has to be inoculated with a suitable bacteria culture. The so-called activated sludge process was thus developed, which can be defined as a biological sewage treatment process in which a mixture of sewage and activated sludge is agitated and aerated. The activated sludge is subsequently separated from this mixed liquor, for instance by sedimentation and wasted or returned to the process as needed. The clear water constitutes the effluent from the plant. Thus, the activated sludge process in principle is a biological purifying process in which a mixture of sewage and active sludge is stirred and aerated. In this process the active bacteria exist in very high concentration in the biological oxidizing means and the bacteria always having sufficient access to oxygen because of the continuous supply of air and furthermore, due to the movement of the water in said means, the flocculent mass formed does not sink to the bottom of the aerated basin and become inactive.

Two important basic conditions for the active sludge process are as follows:

a. The active sludge must be of such a nature that with the sewage serving as nutritious substrate it grows and thereby consumes the organic substance in the sewage.

b. The active sludge must be of such a nature that it can be easily separated from the water, for instance by means of sedimentation.

However, these two conditions cannot be fulfilled to the same degree simultaneously. A newly formed bacteria culture in a state of healthy growth certainly fulfils condition *a* well, but condition *b* less satisfactorily. An older sludge is to a great extent mineralized and thus fulfils condition *b* well, but not in the same degree condition *a*. In practice, therefore, the activated sludge process is carried out as a compromise where endeavors are made to comply with both conditions.

According to a known method nitrifying organisms which are present in the sewage treatment system are cultured and built up in a separate culture tank and supplied with nitrogenous nutriments in the form of chemicals or nutriments from any desired suitable source, whereby a relatively concentrated culture of nitrifying organisms is produced. Said culture is used as an inoculum to one or more points at or ahead of the biological oxidizing means. This culture thus is built up from two components, one inoculum returned from a later stage of the process (f.i. effluent or mixed liquor) and one nitrogen source (f.i. sludge or supernatant liquour from the digester).

An additional technical disadvantage with this known method is that it requires constant supervision with regard to regulation of the flow of return sludge and excess sludge. Furthermore, the process is sensitive to poisoning caused by sudden supply of certain industrial wastes.

It is an object of my present invention to effect a shorter reaction time between sludge and water.

A further object of my invention is to eliminate large pumpage requirements and to eliminate any pumpage of effluent from a point after the biological oxidation means. Such pumpage is disadvantageous not only because of large pumpage requirements but also because of its decreasing the reaction time of biological process.

Figure 2:
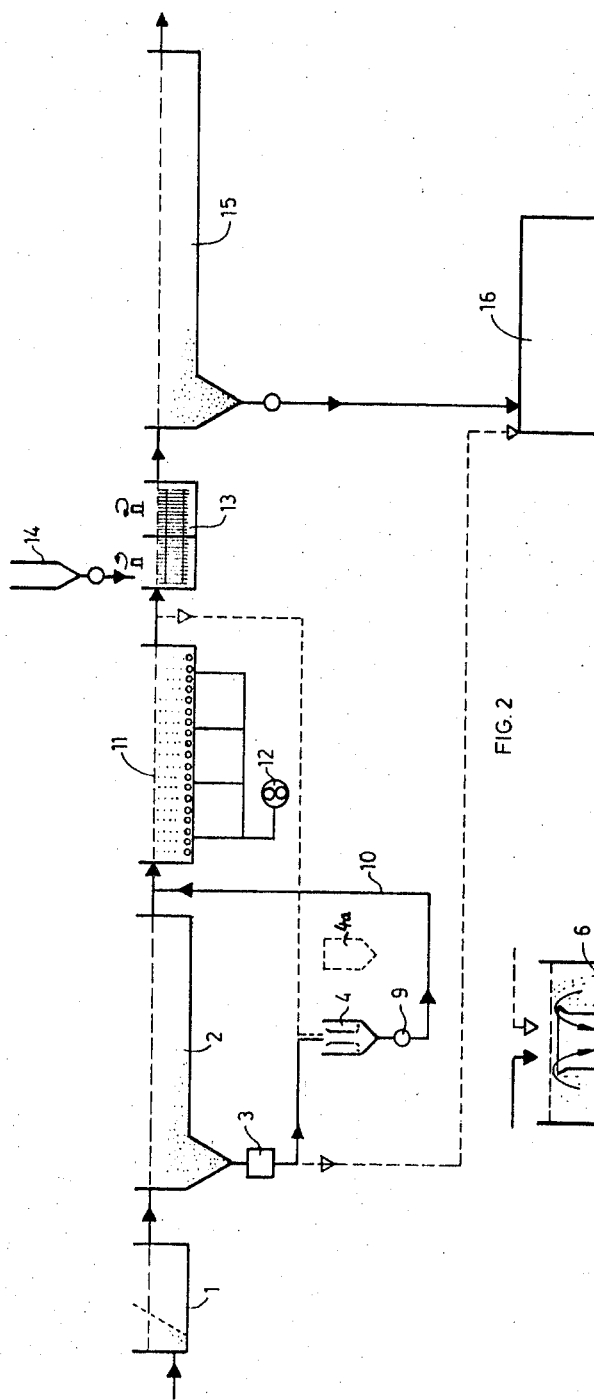
Figure 3:
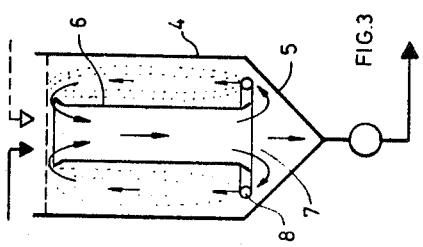
Figure 4:
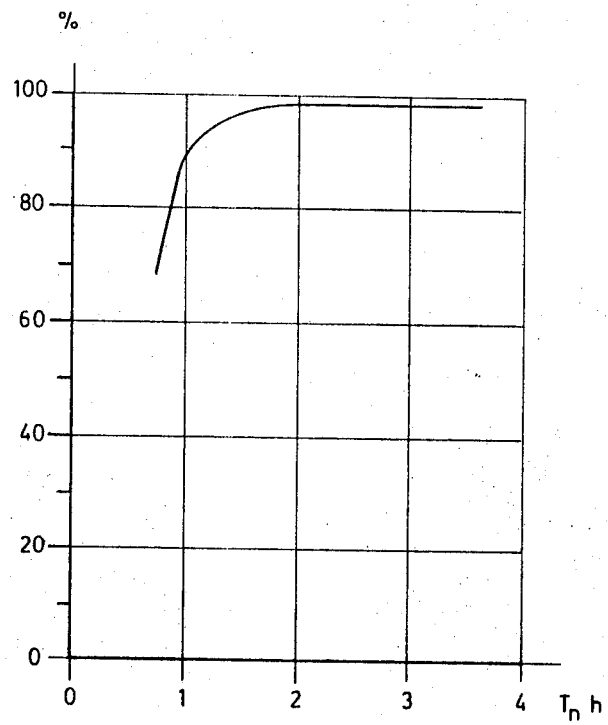

Preferred embodiments of my invention are hereinafter described with reference to the accompanying drawings in which FIG. 1 shows a flow diagram of the principle of my invention, FIG. 2 schematically illustrates a suitable plant for carrying out the process, FIG. 3 shows the cultivating tank in FIG. 2 on an enlarged scale, and FIG. 4 shows a diagram of the efficiency of the process.

In the several drawings, like elements are designated by the same reference numbers.

As is clear from the flow diagram shown in FIG. 1 the sewage enters a pre-treating part of the plant which may, for example, consist of a strainer and sand trap of conventional design. The pre-treated water is then fed to a primary basin from which separated sludge passes via a homogenizing means to a separate cultivating tank where a high-activated sludge is produced. The high-activated sludge thus obtained, containing a culture of heterotrophical bacteria, i.e., bacteria adapted to high concentrations of organic matter, is then supplied to the sewage as an inoculum to one or more points before or after the inlet to the biological oxidizing means. From the biological oxidizing means the sewage containing sludge is fed to coagulating tanks, preferably after the addition of coagulants. From said coagulating tanks the suspension is led to a sludge-separating means where the sludge is removed by sedimentation, floation or filtration in equipment of conventional design, and the purified sewage is allowed to pass on. As indicated in dotted lines on the flow diagram a minor amount of the suspension leaving the biological oxidizing means may be used in order to start up the cultivation of said bacteria culture in the cultivation tank.

As can be seen, the sludge separated in the primary sedimentation basin is used to prepare a bacteria culture which is designated as a superactive or high-activated sludge. This sludge is used according to the invention instead of the return sludge used in earlier processes for inoculation of the activated sludge process. The primary sludge may suitably be homogenized before it is fed to the separate cultivating tank where the high-activated sludge is produced. The quantity of primary sludge used for cultivation may be varied as required and any primary sludge which has not been used for this cultivation can suitably be led to a separate means for some other treatment.

A plant suitable for carrying out the method proposed according to the invention is as an example shown in FIG. 2.

The plant comprises a strainer and sand trap 1 connected to a pre-sedimentation basin 2. The primary sludge obtained in the pre-sedimentation basin 2 is subjected to homogenization in a disintegrator 3, ball mill or the like and is then led to a separate cultivating tank 4. The cultivating tank 4 consists of a container to which air is supplied in such a way that an intensive aeration and total mixing of the primary sludge is obtained. According to the embodiment shown in FIG. 3, the cultivating tank 4 is cylindrical with a conically narrowing bottom 5 and is provided with an inner cylinder 6 to achieve the desired circulation. The air supply to the cultivating tank 4 is effected by means of an annular tube 7 arranged at the bottom 5 of the container near the transition between cylinder and cone and having holes 8 distributed along its circumference.

The homogenized sludge is introduced into the upper part of the cultivating tank. The air supply will cause the contents of the cultivating tank 4 to circulate with a downwardly directed movement in the inner cylinder 6. The high-activated sludge obtained is extracted at the conical bottom 5 of the tank 4 and is fed through a conduit 10 provided with a pump 9 to the sewage leaving the primary sedimentation basin 2 just before it enters a biological oxidizing means, shown in the drawing as an aeration tank 11. The latter is connected in conventional manner to a blowing machine 12 for a continuous supply of air. The water treated in the aeration tank 11 is then led to a coagulating tank 13, suitably provided with mechanical stirrers, where coagulants may be added through a suitable dosage means 14 with a view to improving the sedimentation. Examples of coagulants are aluminum sulphate, ferric chloride and lime. The doses may in this case reach, for example, for aluminum sulphate about 150 g./m.$^3$, for ferric chloride about 100 g./m.$^3$ and for lime about 250 g./m$^3$. After the coagulation tank the mixture is led to a sludge-separating means 15 where the sludge is removed, f.i. by sedimentation, and the water runs over a weir. The sludge thus obtained may then suitably be transferred to a basin 16 for final sludge treatment, for example by aerobic stabilization. This basin 16 may also be used to stabilize any primary sludge in excess.

The present method makes it possible to avoid the conventional digestion tank to stabilize the primary sludge and it will usually be convenient to use aerobic stabilization and dewatering of the separated sludge instead of digestion according to conventional methods.

The cultivating tank 4 may be divided into two units 4, 4a, connected in series so that increased protection is obtained against any poisoning of the process.

Due to the use of a separately cultivated high-activated sludge to inoculate the process, as suggested according to the invention, the following advantages are gained:

a. an accelerated active sludge process and consequently a shorter reaction time, b. the method according to the invention permits the substrate to be more thoroughly used up, and thus enables a higher degree of purification, c. the separate cultivation of the high-activated sludge may be carried out, for example, by a delayed charging of the primary sludge so that protection is obtained against poisoning of the process, d. according to the method of the invention the operational regulation of the process can be normally limited to a variable withdrawal of the high-activated sludge from the cultivating tank, e. the pumping of return sludge which requires carefully supervision in conventional methods can be completely avoided according to the invention, f. with the method according to the invention no stabilization of the primary sludge is, normally, necessary.

In order to further explain the present invention and clarify the technical effect achieved according to the invention, reference is made to the following example.

EXAMPLE

The following technical calculations have been carried out with the help of a mathematical model of the active sludge process published in Water Research Pergamon Press, 1967, Vol. 1, pages 795–804.

CALCULATION ASSUMPTIONS

In order to simplify the calculations it is assumed that the supply of waste water to the purifying plant is constant. Oxygen equivalents (grams oxygen per m.$^3$) are chosen as pollution measure in accordance with the definition used in the above reference.

The flow of sewage is assumed to be 100 m.$^3$/h. After the primary treatment the concentration of the de-sludged sewage is assumed to correspond to 200 g. oxygen per m.$^3$, which value constitutes the substrate concentration "S." A flow of 0.5 m.$^3$/h. is removed as primary sludge. The concentration of the sludge is assumed to correspond to 20,000 g. oxygen per m$^3$. The sludge is treated in the cultivating tank for high-activated sludge, which consists of an aeration basin with thorough mixing. The aeration time, $T_c$(h), is chosen in such a way that the substrate concentration of the effluent is approximately the same as that of the de-sludged sewage, i.e., about 200 g. oxygen per m$^3$. The sludge from the cultivating tank is led to the active sludge equipment where it is mixed with the de-sludged sewage.

CALCULATIONS AND RESULTS

The technical calculations concerning the cultivating tank were carried out according to the mathematical model mentioned earlier and with the following constant (designations, (designations see previously mentioned reference):

$a = 4$ g./m.$^3$, h.
$= 0.0005$ m.$^3$/g., h.
$m = 0.2$ h.$^{-1}$
$= 0.4$

The following results were obtained:
$T_C = 5.6$ h.
$Z = 38$ g./m.$^3$
$X = 7,400$ The volume of the cultivating tank is obviously 2.8 m$^3$.

In order to calculate the numerical relations of the biological process in the aeration tank, the method of calculation used in the mathematical model mentioned earlier must be modified with respect to the altered conditions. The balance equation for the concentration of living bacteria, X, is if the balance equation is referred to the time unit 1 hour:

$$0.5 \times 7{,}400 + 0.5\, T_n X (1 - a/S) = 100 X$$

The balance equation for the content of dead cells, Z, is:

$$0.5 \times 38 + 0.5\, T_n X a/S - 0.5\, T_n bXZ = 100 Z \quad \quad 2$$

The balance equation for the substrate is:

$$100 \times 200 + 0.5\, T_n bxZ - 0.5\, T_n mX/Y = 100 S \quad \quad 3$$

$T_n$ is the detention time (h) spent in the aeration basin and $S$ in this case designs the substrate concentration of the effluent.

The efficiency of the process is designated $\eta$ and is defined as $100\, 300 - S/300$.

The calculation results are evident from Table 1.

TABLE 1

Corresponding values for the magnitudes S, X, Z, $T_n$ and $\eta$:

| S | X | Z | $T_n$ | $\eta$ |
|---|---|---|---|---|
| 5 | 133 | 339 | 3,60 | 98,3 |
| 8 | 279 | 193 | 1,72 | 97,3 |
| 10 | 305 | 146 | 1,46 | 96,7 |
| 20 | 323 | 73 | 1,10 | 93,3 |
| 30 | 346 | 45 | 1,03 | 90,0 |
| 40 | 300 | 26 | 0,97 1 | 86, |

As evident from FIG. 4 the proposed method produces a high degree of efficiency after only a relatively short time. When comparing the obtained results with corresponding calculations of a conventional process using the same constant values and hydraulic conditions it has been proved that the efficiency with increasing the intention times asymtotically approaches a limit value not exceeding 93.3 percent, whereas by using high-activated sludge values and about 98 percent can be achieved.

What I claim is:

1. The method of biologically treating raw sewage which comprises:

a. subjecting raw sewage to primary clarification, thereby obtaining primary sludge and primary clarified sewage;

b. passing said primary clarified sewage to a biological oxidizing means, while c. simultaneously forming a high activated culture of heterotrophical bacteria consisting essentially of culture produced essentially from primary sludge by cultivating at least a portion of said primary sludge in an aerated culture tank;
d. forming a suspension in said biological oxidizing means by supplying as an inoculum to said primary clarified sewage a culture consisting essentially of said high activated culture produced in step (c); and
e. subjecting said suspension to a secondary clarification, thereby obtaining a secondary sludge and finally clarified sewage.

2. The method of treating sewage according to claim 1, wherein said primary sludge is homogenized before being cultivated in said cultivating tank.

3. The method of treating sewage according to claim 1, wherein said primary sludge during the cultivation process is subjected to such an aeration time that the concentration of the liquid phase leaving together with the high-activated sludge will substantially be of the same order of magnitude as the concentration of the water desludged by the pre-sedimentation process.

* * * * *

UNITED STATES PATENT OFFICE
CERTIFICATE OF CORRECTION

Patent No. 3,652,406      Dated  March 28, 1972

Inventor(s)  Nils Carl Gustav Westberg

It is certified that error appears in the above-identified patent and that said Letters Patent are hereby corrected as shown below:

Column 4, line 16,   "(designations," should read --values--;

line 19,   should read --b = 0.0005 m.$^3$/g., h--;

line 21,   should read --Y = 0.4--;

line 35,   at the far right, --1-- should be added;

line 39,   "bxZ" should read --bXZ--;

line 57,   "0.97 1" should read --0.97--; and

"86," should read --86,7--;

line 67,   "and" should be omitted

Signed and sealed this 15th day of August 1972.

(SEAL)
Attest:

EDWARD M. FLETCHER, JR.
Attesting Officer

ROBERT GOTTSCHALK
Commissioner of Patents